United States Patent
Kenmochi et al.

(10) Patent No.: US 6,319,593 B1
(45) Date of Patent: *Nov. 20, 2001

(54) DISPOSABLE CLEANING SHEET

(75) Inventors: Yasuhiko Kenmochi; Yoshinori Tanaka; Yukiko Iida, all of Kagawa (JP)

(73) Assignee: Uni-Charm Corporation, Ehime (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,958

(22) Filed: Mar. 18, 1999

(30) Foreign Application Priority Data

Mar. 19, 1998 (JP) .................................... 10-070234

(51) Int. Cl.$^7$ ..................................................... B32B 27/14
(52) U.S. Cl. .......................... 428/198; 428/169; 428/193; 442/170; 15/209.1
(58) Field of Search .................................. 428/196, 198, 428/193, 169; 442/91, 170; 15/209.1

(56) References Cited

U.S. PATENT DOCUMENTS 5,229,191 * 7/1993 Austin .................................. 428/198
5,964,742 * 10/1999 McCormack et al. ............... 604/380

FOREIGN PATENT DOCUMENTS

| 2262121 | 7/1974 | (DE) . |
| 0 289 198 | 11/1988 | (EP) . |
| 05 245 090 | 9/1993 | (EP) . |
| 0 774 229 A2 | 5/1997 | (EP) . |
| 0 774 229 A3 | 4/1998 | (EP) . |
| 09135798 | 5/1997 | (JP) . |

* cited by examiner

Primary Examiner—Rosemary Ashton
(74) Attorney, Agent, or Firm—Darby & Darby

(57) ABSTRACT

A cleaning sheet including a base sheet and at least one surface layer of filaments placed on the base sheet is described. The filaments extend in one direction and each of the filaments extends over the whole length of the surface layer in the extension direction of the filaments. The base sheet and the surface layers are bonded to each other at a plurality of bonding lines intersecting the extension direction. The surface layer includes a plurality of filaments-holding regions, each of which includes at least one end of the bonding line other than the bonding lines forming the filaments-holding region. Accordingly, in the filaments-holding regions, differences-in-level for collecting dust are formed and gaps (pockets) for capturing the dust therein are exposed.

13 Claims, 6 Drawing Sheets

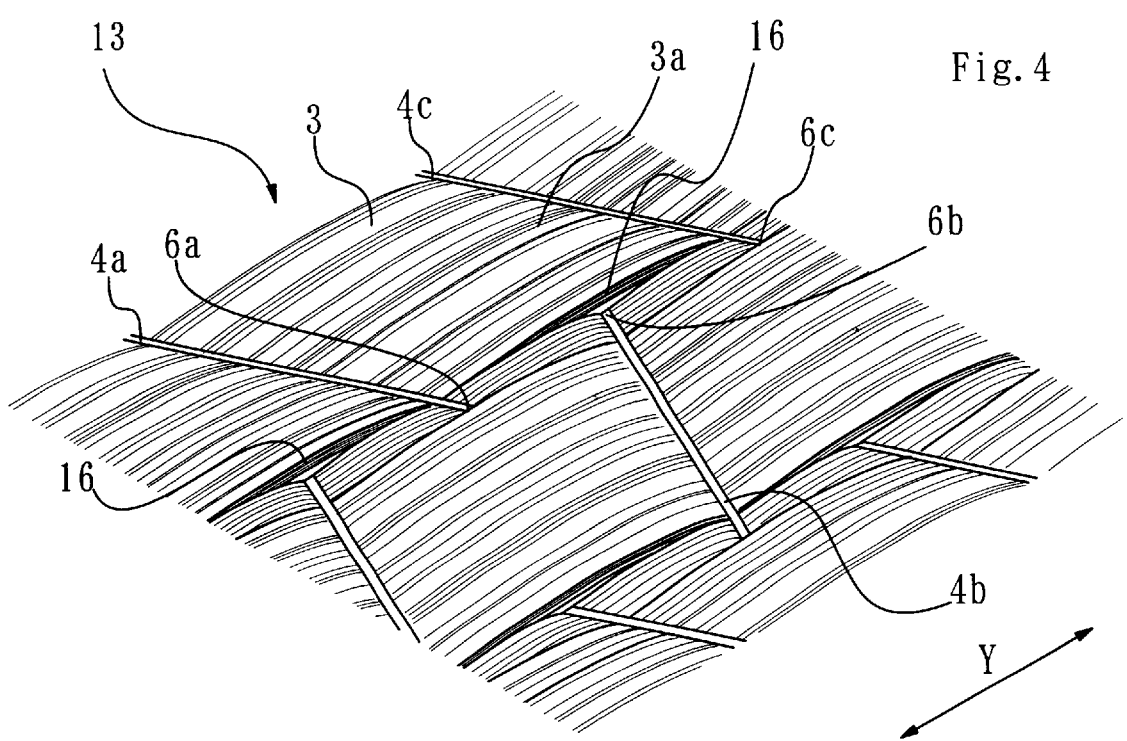

DISPOSABLE CLEANING SHEET

FIELD OF THE INVENTION

The present invention relates to disposable cleaning sheets having a soft surface and excellent dust-collecting properties.

BACKGROUND OF THE INVENTION

Cleaning sheets formed from short fibers, or filaments, are conventionally used as a dusting or cleaning agent. In particular, a conventional disposable cleaning sheet has a wiping surface area formed from nonwoven fabric consisting of relatively short fibers. The cleaning sheets may be attached to a cleaning tool such as a mop or similar device, or used by hand.

However, the conventional disposable cleaning sheet is not very effective for capturing relatively large dust particles, and the fibers have a tendency to fall out of the cleaning sheet, thereby further reducing the effectiveness. These problems arise from the use of relatively short fibers in the nonwoven fabric.

Another disadvantage of conventional cleaning sheets is that they have relatively hard or "scratchy" wiping surfaces. As a consequence, when the object to be cleaned, such as furniture or other household effect having a soft or painted surface, is wiped with force using a conventional cleaning sheet there is a possibility that the surface will be scratched. In addition, since the wiping area of conventional cleaning sheets is flat, the dirt and dust adheres mostly to the peripheral portions of the cleaning sheet when in use so that the middle area of the cleaning sheet surface is not effectively used.

One example of a disposable wiping tool, described in Japanese Patent Publication No. Hei-9-135798, includes a cleaning sheet that contains a base sheet having a surface layer of filaments which are relatively longer than the short fibers of conventional cleaning sheets. The filaments are bonded to the base sheet at fusion-bonding lines and are also maintained in the sheet using intermittently arranged wires, resulting in a cleaning surface that is not flat. The use of longer fibers and wires helps to prevent the filaments from falling out. However, this wiping tool has difficulty capturing larger dust particles. Furthermore, while filaments disposed at the uppermost region of the surface layer can capture dust during use, filaments disposed near the bottom of the surface layer (near to the base sheet) are not utilized effectively.

Therefore, it would be beneficial to have a cleaning sheet which effectively captures both large and small particles of dust, is soft enough to prevent the scratching of a surface to be cleaned, uses a greater surface area of the surface layer, and has a decreased tendency to lose the fibers which form the cleaning surface.

SUMMARY OF THE INVENTION

The present invention is directed to a cleaning sheet having a base sheet and a surface layer of filaments, which filaments are relatively longer than fibers used in conventional cleaning sheets and which are bonded to the base sheet at fusion-bonding lines. The longer filaments used in the invention do not fall out of the cleaning surface. The cleaning sheet of the invention has excellent dust collecting properties for capturing large dust particles, and a soft surface to prevent damage to the surfaces of the object cleaned.

The present invention provides a cleaning sheet comprising a base sheet and at least one surface layer containing filaments or strip-shaped materials placed on the base sheet. The filaments or strip-shaped materials are oriented in one direction and each extends over the entire length of the surface layer in the extension direction of the filaments or strip-shaped materials. The base sheet and the surface layer are bonded to each other at a plurality of bonding lines intersecting the extension direction of the filaments or strip-shaped materials, the surface layer including a plurality of holding regions. Each holding region is formed between two bonding lines adjacent to each other in the extension direction, thereby holding each of the filaments or strip-shaped materials positioned therein to the base sheet at said two bonding lines. Each of the holding regions includes at least one end of a bonding line other than said two bonding lines.

In each of the holding regions of the cleaning sheet, the filaments or strip-shaped materials of the surface layer are divided into two portions such that a difference in level is formed therebetween, and a gap between the surface layer and the base sheet is slightly exposed so as to have an entrance. Therefore, the gaps function like pockets capable of capturing relatively large particles such as crumbs. Both the filaments exposed at the surface of the cleaning sheet and the filaments disposed near the base sheet contribute during a wiping operation. As a result, the dust-collecting property of the cleaning sheet is enhanced by the whole sheet.

Moreover, since the surface layer is composed of the filaments or strip-shaped materials, the sheet surface used for wiping is satisfactorily soft. Accordingly, even when the cleaning sheet is used for wiping objects vulnerable to scratching, such as furniture or household effects having soft or coated surfaces, scratches or similar damage is prevented.

In the present invention, it is preferable that the base sheet and the surface layer contain thermoplastic resin and the bonding lines are formed by fusion-bonding.

Further, it is preferable that the bonding lines include first bonding lines having first columns and second bonding lines having second columns, each of the columns including bonding lines arranged at regular intervals in the extension direction, wherein the first and second columns alternate with each other in a direction perpendicular to the extension direction. In addition, it is preferable that the first bonding lines are inclined at a first angle to the extension direction and the second bonding lines are inclined at a second angle to the extension direction, the first and second inclination angles being symmetrical to each other with respect to the extension direction.

Alternatively, it is also preferable that the bonding lines include long bonding lines and short bonding lines, wherein the long bonding lines are arranged at regular intervals in the extension direction and each continuously traverses the surface layer, and that holding regions are formed between the long bonding lines, which are adjacent to each other in the extension direction and which include a plurality of the short bonding lines arranged therein.

In the present invention, it is preferable that the surface layer has a wiping area wherein the surface layer is exposed on the cleaning sheet and the bonding lines are formed more densely in the peripheral portions of the wiping area than in the middle portion of the wiping area, or peripheral portions of the wiping area are pressed without bonding thereof so that volume of the peripheral portions is smaller than that of the middle portion.

Furthermore, in the present invention, it is preferable that the cleaning sheet is impregnated with an oil-based agent.

BRIEF DESCRIPTION OF THE DRAWINGS

FIG. 4 is a partially enlarged perspective view showing differences-in-level of the cleaning sheet according to the present invention.

DETAILED DESCRIPTION OF THE INVENTION

The present invention is now described with reference to the accompanying drawings.

Figure 1:
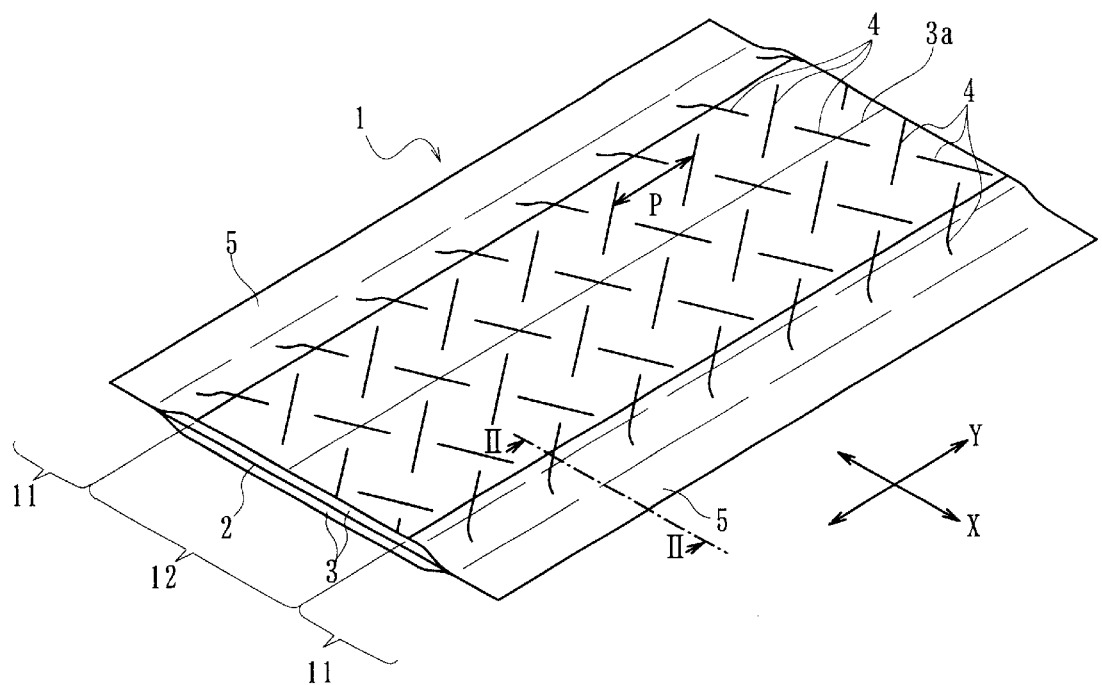
FIG. 1 is a perspective view showing an embodiment of a cleaning sheet according to the present invention.
Figure 2:
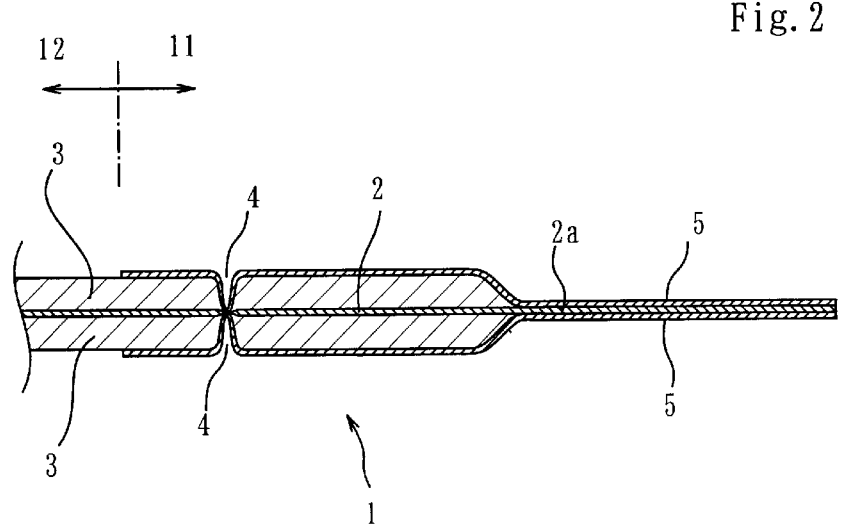
FIG. 2 is a partially enlarged sectional view taken along line II—II of the cleaning sheet shown in FIG. 1.

FIG. 1 is a perspective view showing an embodiment of a cleaning sheet according to the present invention. FIG. 2 is an enlarged sectional view showing the structure of a side edge of the cleaning sheet shown in FIG. 1, taken along the line II—II.

A cleaning sheet 1 shown in FIG. 1 comprises a base sheet 2 and surface layers 3 disposed on both surfaces of the base sheet 2 and bonded to the base sheet 2 at a plurality of bonding lines 4. The base sheet 2 and the surface layers 3 contain a thermoplastic resin. Therefore, the bonding between the surface layers 3 and the base sheet 2 at the bonding lines 4 can be performed by fusion-bonding. That is, the bonding lines 4 can be formed by fusion-bonding. The fusion-bonding can be performed by means of thermal processing (by using heat emboss roll) or ultrasonic welding. By using fusion-bonding, the necessary number and shapes of bonding lines 4 can be formed easily.

Alternatively, the bonding lines 4 can be formed by means of an adhesive.

For the base sheet 2, any material having the strength sufficient for use can be employed, such as a cloth containing synthetic resins or a film made of resin and a nonwoven fabric manufactured by a spun-bond method or a spun-lace method.

As shown in FIGS. 1 and 2, the surface layers 3 are disposed in a middle portion of the base sheet 2 in the X direction (width direction) but are not disposed in side portions 2a located on both the sides of the base sheet 2 in the X direction. The side portions 2a are provided with auxiliary sheets 5 as shown in FIG. 2. The auxiliary sheets 5 can also be made of any material having the strength sufficient for use, such as a cloth containing synthetic resins or a film made of resin and a nonwoven fabric manufactured by a spun-bond method or a spun- lace method. The auxiliary sheets 5 extend from the side portions 2a toward the middle portion of the base sheet 2, thereby covering both side edges of the surface layers 3 in the X direction. The side portions 2a of the base sheet 2 and the auxiliary sheets 5 are bonded to each other by means of an adhesive or fusion-bonding. Further, the base sheet 2, the surface layers 3 and the auxiliary sheets 5 are bonded to one another at the bonding lines 4 in the area where the auxiliary sheets 5 cover both the side edges of the surface layers 3.

Figure 8:
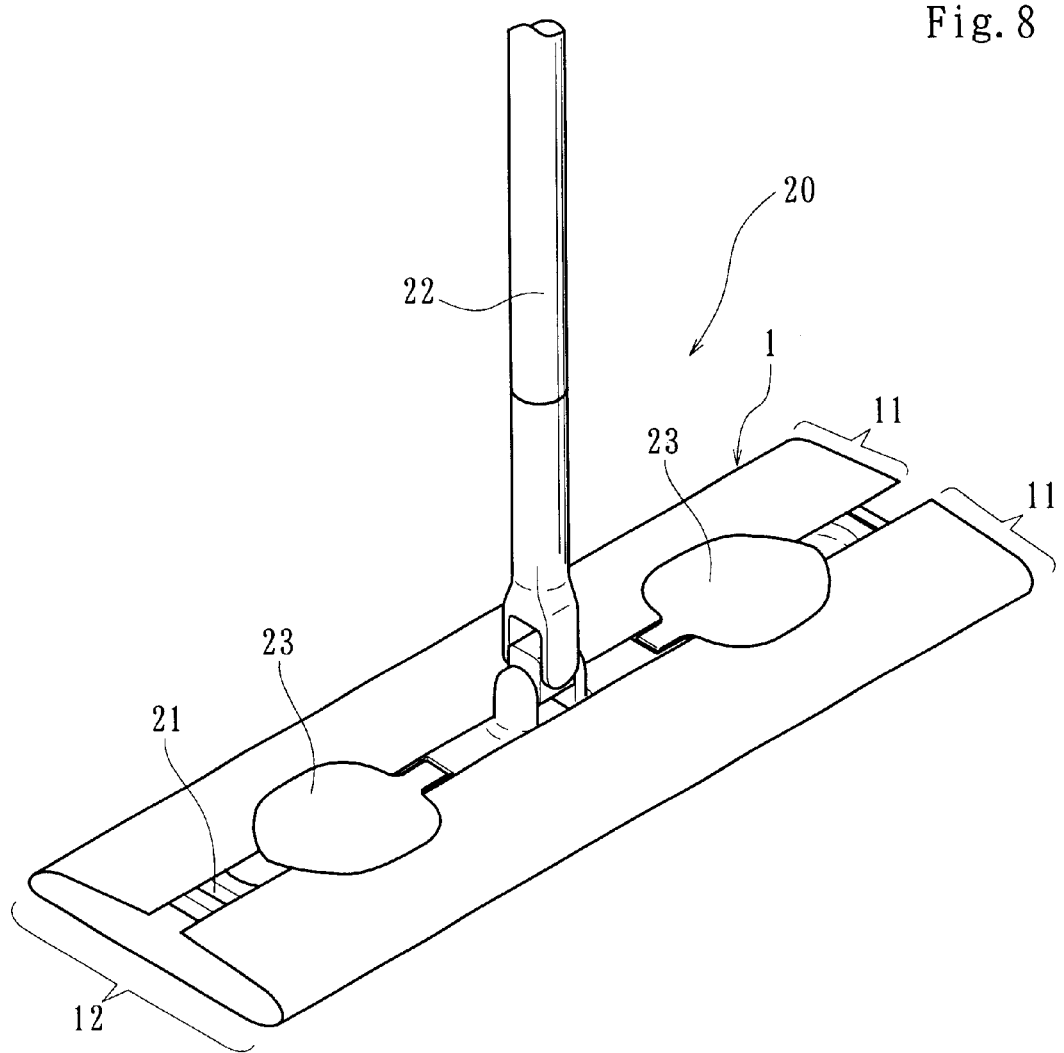
FIG. 8 shows an example of the cleaning sheet according to the present invention attached to a cleaning tool.

In such structure, as shown in FIG. 1, the surface layers 3 are exposed on both surfaces of the cleaning sheet 1 and between the auxiliary sheets 5. These areas where the surface layers 3 are exposed are referred to as wiping areas 12 capable of collecting dust, or the like, during use. On the other hand, the remaining areas where the auxiliary sheets 5 are disposed are referred to as attachment areas 11 for attaching the cleaning sheet 1 to a cleaning tool such as a cleaning mop as shown in FIG. 8. However, when the cleaning sheet is not to be attached to a cleaning mop or the like, and is to be held by hand for use, it is not necessary to provide the attachment areas 11.

In this embodiment, since the surface layers 3 are disposed on both surfaces of the base sheet 2, both the surfaces of the cleaning sheet 1 have a wiping area 12 which can be used for wiping. However, the surface layer 3 can also be disposed on only one surface of the base sheet 2 if desired.

The surface layers 3 are formed from a plurality of filaments 3a. The individual filaments 3a constituting the surface layers 3 are oriented in the Y direction and extend over the whole length of the surface layers 3 (equal to the whole length of the cleaning sheet 1) in the Y direction. FIG. 1 shows one of the filaments 3a to demonstrate such extension of the individual filaments 3a.

The filaments 3a can be formed into a material generally described as a tow, for example, to be used for the surface layers 3. A "tow" means a bundle comprising a great number of oriented filaments. For example, the tow is formed by bundling 2,000 to 10,000 of the filaments, wherein each filament is from 2 to 30 denier. The cleaning sheet 1 can be produced at low cost by using the tow for the surface layers 3. The filaments 3a are manufactured from, for example, nylon, rayon, and thermoplastic resins such as polyethylene, polypropylene and polyester (polyethylene terephthalate). Among them, particularly, polypropylene, which has a low melting point, is preferably used.

The filaments 3a may be formed from composite fibers comprising (1) polyethylene terephthalate as a core component and polyethylene as a sheath component, (2) polyethylene terephthalate as a core component and a sheath component, (3) polyethylene terephthalate as a core component and polypropylene as a sheath component, (4) polypropylene as a core component and a sheath component or (5) polypropylene as a core component and polyethylene as a sheath component. Among them, composite fibers comprising (1) polyethylene terephthalate as a core component and polyethylene as a sheath component are preferably used. Each of the composite fibers is preferably from 1 to 50 denier, more preferably 2 to 10 denier.

The wiping area 12, where the filaments 3a are exposed, is softer than that of a conventional cleaning sheet using a nonwoven fabric made of relatively short fibers. Accordingly, by using the cleaning sheet 1 of the present invention for the wiping operation, damage by scratches or the like to a soft or coated surface of an object to be cleaned, such as furniture, can be prevented.

Alternatively, the surface layer 3 may be formed using a plurality of strip-shaped materials oriented in the same direction instead of the filaments 3a. The strip-shaped materials are manufactured by cutting a sheet-shaped material, such as a nonwoven fabric or a film, into a rectangular shape and extremely small width. The rectangular materials thus obtained i.e., the strip-shaped materials, are further bundled and used for the surface layer 3. Further, nonwoven fabrics having a great number of rifts formed therein at relatively short intervals and further bundled can be used as the strip-shaped materials.

Figure 3:
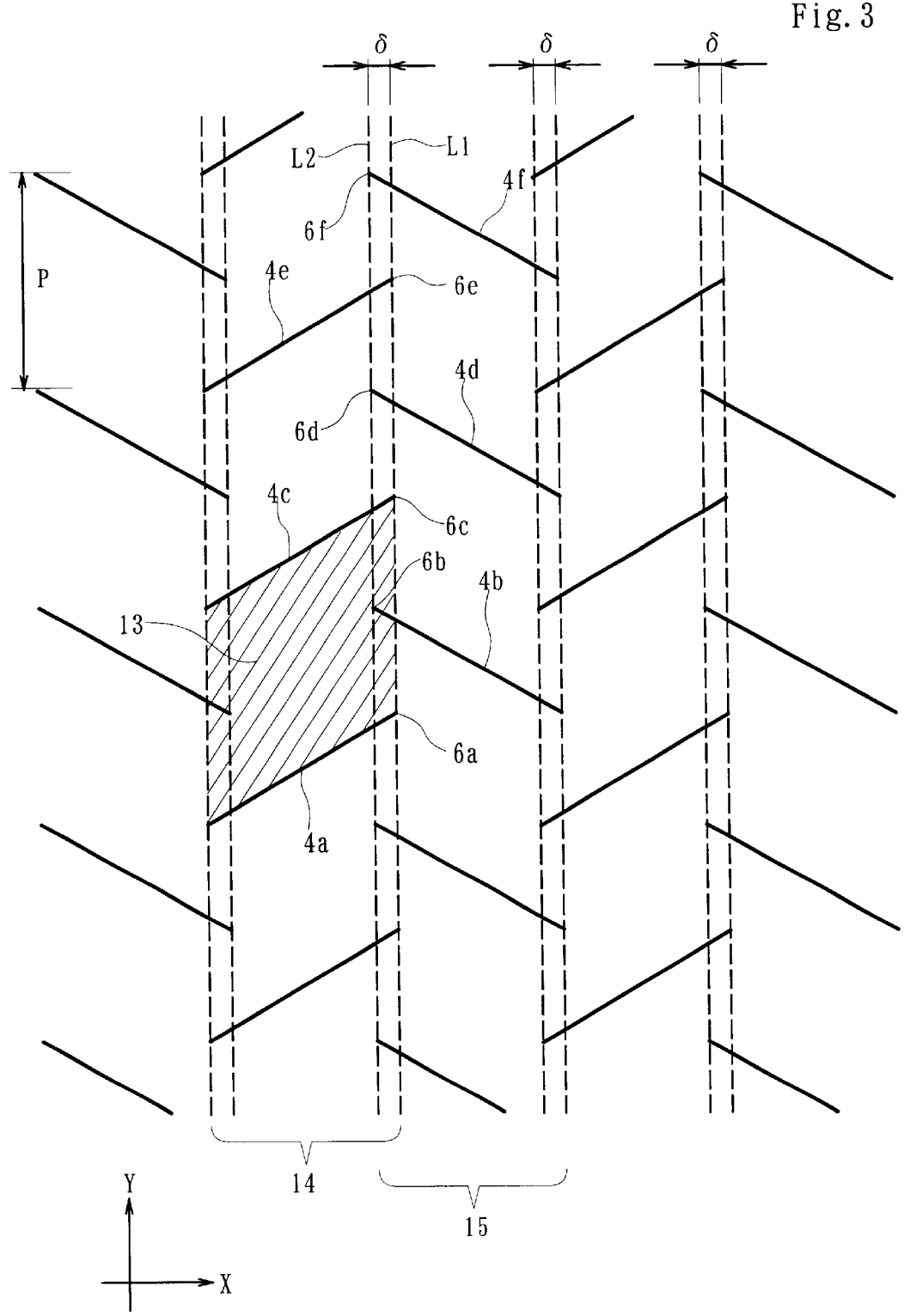
FIG. 3 is a plan view showing an arrangement pattern of bonding lines of the cleaning sheet according to the present invention.

FIG. 3 is a plan view showing an arrangement pattern of the bonding lines 4 of the cleaning sheet 1 shown in FIG. 1.

As has been described above, the surface layers 3 of the cleaning sheet 1 are formed from the filaments 3a, each of which extends over the whole length of the surface layers 3 in the Y direction. Therefore, the bonding lines 4 are formed so as to prevent the loss, i.e., falling out, of the individual filaments 3a from the cleaning sheet 1.

The arrangement pattern of the bonding lines 4 in FIG. 1 are shown in FIG. 3 in detail. As shown in FIG. 3, the bonding lines 4 can be classified into two groups (hereinafter referred to as "first bonding line" and "second bonding line"). The first bonding lines are inclined at a first angle to the Y direction (the extension direction of the filaments 3a) and the second bonding lines are inclined at a second angle to the Y direction and the first and second inclination angles are symmetrical to each other with respect to the Y direction. Furthermore, the first bonding lines constitute first columns and the second bonding lines constitute second columns. Each of the first columns include the first bonding lines arranged at regular intervals in the Y direction and each of the second columns include the second bonding lines arranged at regular intervals in the Y direction. The first and second columns alternate with each other in the X direction perpendicular to the Y direction.

In FIG. 3, the first bonding lines are exemplified by bonding lines 4a, 4c and 4e and the second bonding lines are exemplified by bonding lines 4b, 4d and 4f.

The bonding lines 4a, 4c and 4e are arranged in a region 14 (thereby forming one of the first columns) at regular intervals (at an arrangement pitch P of 30 to 40 mm) in the Y direction. The bonding lines 4a, 4c and 4e are parallel to one another and are inclined in both the X and Y directions. Furthermore, the bonding lines 4a, 4c and 4e have the same length of 30 to 40 mm and end portions 6a, 6c and 6e of the bonding lines 4a, 4c and 4e are positioned on a virtual straight line L1 extending in the Y direction. In such an arrangement, filaments 3a which are present in the region 14 are bonded to the base sheet 2 repeatedly at the arrangement pitch P so that the filaments 3a in the region 14 are securely held to the base sheet 2.

The bonding lines 4b, 4d and 4f are arranged in a region 15 next to the region 14 (thereby forming one of the second columns). The bonding lines 4b, 4d and 4f are arranged at regular intervals (at the same arrangement pitch P as in the bonding lines 4a, 4c and 4e) in the Y direction. The bonding lines 4b, 4d and 4f are parallel to one another and are inclined in both the X and Y directions, but are further inclined to the bonding lines 4a, 4c and 4e. Furthermore, the bonding lines 4b, 4d and 4f have the same length as that of the bonding lines 4a, 4c and 4e. End portions 6b, 6d and 6f of the bonding lines 4b, 4d and 4f are positioned on a virtual straight line L2 extending in the Y direction. Similarly to the region 14, in such arrangement, filaments 3a which are present in the region 15 are bonded to the base sheet 2 repeatedly at the arrangement pitch P so that the filaments 3a in a region 15 are securely held to the base sheet 2.

As shown in FIG. 3, the bonding lines 4a, 4c and 4e and the bonding lines 4b, 4d and 4f overlap each other, when viewed from the Y direction, having an overlap amount (preferably 2 to 6 mm, more preferably 3 mm). That is, the region 14 and the region 15 overlap each other having the overlap amount δ. In such overlapped manner, the regions 14 where the first bonding lines are arranged in the Y direction, and the regions 15 where the second bonding lines are arranged in the Y direction, alternate with each other in the X direction. In other words, the first columns and the second columns alternate with each other in the X direction having the overlap amount δ. Therefore, the bonding lines 4 can hold all the filaments 3a constituting the surface layers 3 to the base sheet 2. Particularly, the filaments 3a positioned at the overlapped regions having the overlap amount δ are bonded to the base sheet 2 more securely.

With such arrangement pattern of the bonding lines 4, a plurality of filaments-holding regions are formed on the surface layers 3. In FIG. 3, a filaments-holding region 13, as indicated by hatching, exemplifies one of the filaments-holding regions. The terms "filaments-holding region" as used herein means a region positioned between two bonding lines 4 and 4, which are adjacent to each other in the Y direction and thereby bond (hold) each of filaments 3a positioned therein to the base sheet 2 at said two bonding lines 4 and 4. For example, the filaments-holding region 13, as indicated by hatching, is formed between the bonding lines 4a and 4c which are adjacent to each other in the Y direction.

As shown in FIG. 3, the filaments-holding regions are formed repeatedly in the region 14 and each includes corresponding end portions of the second bonding lines arranged in the region 15. For example, the filaments-holding regions 13 include the end portion 6b of the bonding line 4b. Further, the filaments-holding regions are also repeatedly formed in the adjacent region 15 in the same manner and also each includes corresponding one of end portions of the first bonding lines arranged in adjacent regions in the same manner. In such manner, the filaments-holding regions are formed over the whole area of the surface layers 3.

FIG. 4 is a partial perspective view showing, in an enlarged scale, a portion of the surface layer 3 where the filaments-holding regions are formed.

As shown in FIG. 4, in each of the filaments-holding regions, the filaments 3a positioned therein are divided into two portions. This divided state is achieved by using the filaments-holding region 13.

The filaments-holding region 13 is formed between the bonding lines 4a and 4c, adjacent to each other in the Y direction, and includes the end portion 6b of the bonding line 4b. In this filaments-holding region 13, the bonding lines 4a, 4b and 4c are formed by fusion-bonding, thereby pressing the filaments 3a and reducing the thickness of the surface layer 3. Therefore, the filaments 3a are divided into two portions: one is a pressed portion where the filaments 3a are pressed to the base sheet 2 by the bonding line 4b; and the other is a non-pressed portion where the filaments 3a are not pressed to the base sheet 2 by the bonding line 4b. As shown in FIG. 4, accordingly, a difference in level 16 is formed between the pressed portion and non-pressed portion in the filaments-holding region 13. The difference in level 16 is most prominent at the end portion 6b of the bonding line 4b. In addition, a gap between the non-pressed portion and the base sheet 2 is slightly exposed to have an entrance at the end portion 6b of the bonding line 4b.

With such structure, when the cleaning sheet 1 is used in a wiping operation, the gaps in the filaments-holding regions function like pockets to capture dust. More particularly, when the surface layer 3 wipes an object such as furniture, dust is caught by the difference in level 16, which enters into the gaps through the entrances thereof. Accordingly, even relatively large dust or particles such as crumbs, which are difficult to capture using a conventional cleaning sheet, can be captured in the gaps, which function like pockets. Since the dust captured in the gaps is held among the filaments 3a, the captured dust is prevented from being dispersed during the wiping operation. Further, since the dust enters into the gaps and adheres inside of the non-pressed portion of filaments 3a (filaments 3a disposed near the base sheet 2), both the filaments 3a exposed at the surface of the cleaning sheet 1 and the filaments 3a disposed near the base sheet 2 contribute to the wiping operation. Accordingly, more of filaments 3a can participate in the wiping operation, as compared with a conventional cleaning sheet having no gaps exposed thereon, so that the dust-collecting effect of the invention is increased as a whole. Furthermore, the differences in level 16 can also scrape the dust effectively from the object to be cleaned such as furniture in the wiping operation.

Further, during the wiping operation, the bonding lines 4, where the thickness of the surface layer 3 is reduced, can guide the dust into the differences in level 16. Accordingly, since the bonding lines 4 are inclined with respect to both the X and Y directions, and the first and second bonding lines are inclined opposite to each other, dust collecting is effective in any direction when the cleaning sheet 1 is used for the wiping operation.

Furthermore, since the filaments-holding regions arranged throughout the wiping area are clearly divided into two portions, as shown in FIG. 4, the cleaning sheet can also be improved in its appearance as well as in its dust-collection effect.

FIGS. 5(A), 5(B), 5(C), 5(D), 5(E) and 5(F) are partial plan views showing different examples of the arrangement pattern of the bonding lines in the cleaning sheet according to the present invention. In each example, one of the filaments-holding regions is shown by hatching.

Figure 5A:
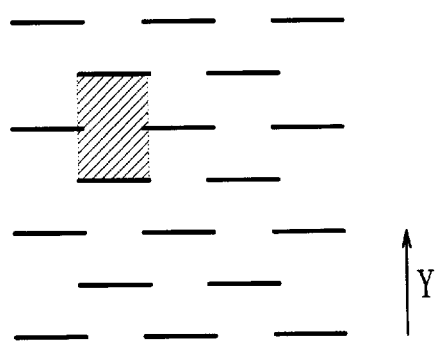
FIGS. 5(A), 5(B), 5(C), 5(D), 5(E) and 5(F) are plan views showing examples of arrangement patterns of bonding lines of the cleaning sheet according to the present invention.

As shown in FIG. 5(A), all of the bonding lines can be formed to extend in one direction perpendicular to the extension direction of the filaments (Y direction).

Figure 5B:
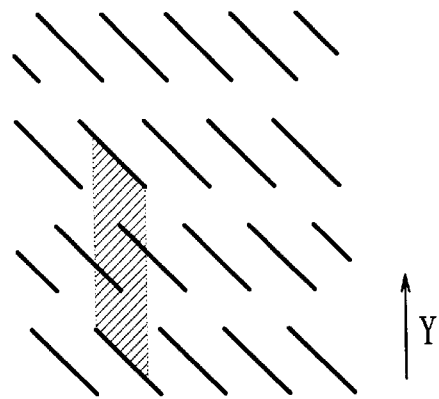

As shown in FIG. 5(B), all of the bonding lines 4 can be formed to extend in one direction oblique to the extension direction of the filaments (Y direction). In the case of FIG. 5(B), the filaments-holding region shown by hatching is smaller than the whole area positioned between two bonding lines. This occurs because all of the filaments positioned in the filaments-holding region have to be bonded to the base sheet at both of the bonding lines defining the filaments-holding region. Therefore, two side lines of the filaments-holding region other than the bonding lines always have to extend along the Y direction, i.e., along the extension direction of the filaments.

Figure 5C:
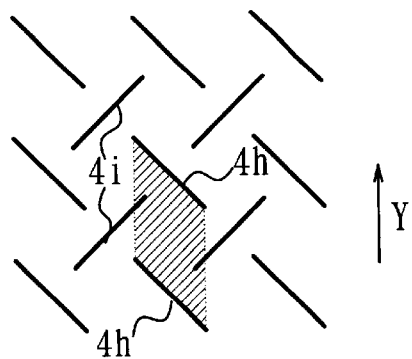

As shown in FIG. 5(C), all of the bonding lines can be formed to extend obliquely to the extension direction of the filaments (Y direction) and bonding lines 4h are perpendicular to bonding lines 4i.

Figure 5D:
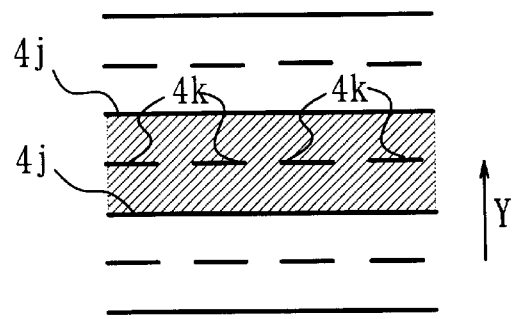

As shown in FIG. 5(D), all of the bonding lines can be formed to extend in one direction perpendicular to the extension direction of the filaments (Y direction) such that a plurality of short bonding lines 4k are arranged in the filaments -holding region defined between long bonding lines 4j and 4j, each continuously traversing the surface layer. In this case, differences in level are formed at end portions of the short bonding lines 4k.

Figure 5E:
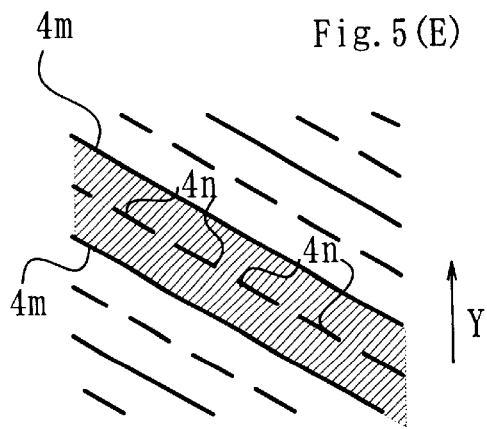

As shown in FIG. 5(E), long bonding lines 4m and short bonding lines 4n can be formed so as to be inclined with respect to the extension direction of the filaments (Y direction).

Figure 5F:
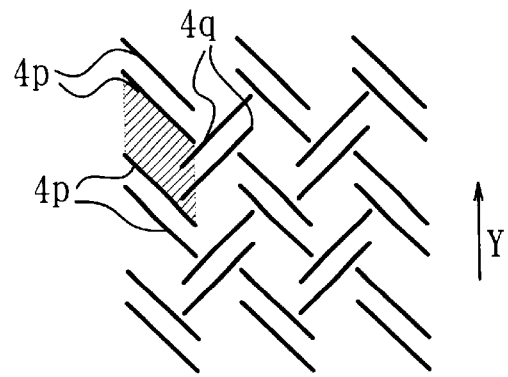

Further, as shown in FIG. 5(F), it is possible that two (or more) bonding lines 4p constitute a first set and two (or more) bonding lines 4q constitute a second set. End portions of the bonding lines 4q constituting the second set may be disposed in the filaments-holding region formed between the first set disposed adjacent to each other in the Y direction.

Figure 6:
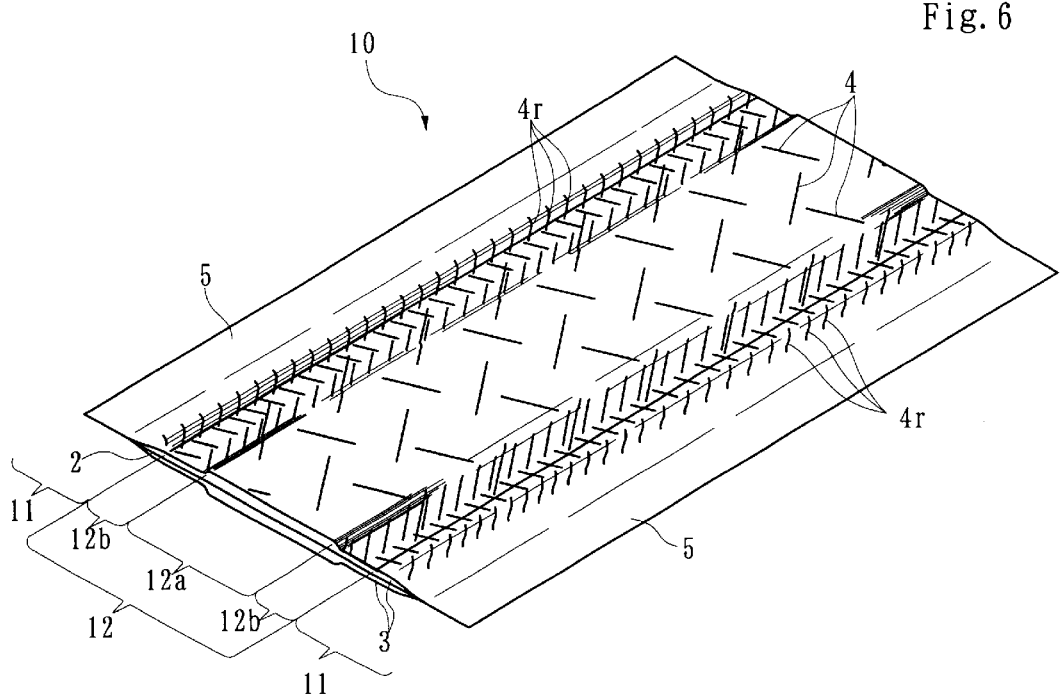
FIG. 6 is a perspective view showing another embodiment of a cleaning sheet according to the present invention.

FIG. 6 is a perspective view showing another embodiment of the cleaning sheet according to the present invention.

The cleaning sheet 10, shown in FIG. 6, comprises the base sheet 2 and the surface layers 3 disposed on both faces of the base sheet 2, in the same manner as in the cleaning sheet 1 shown in FIG. 1. Exposed portions of the surface layers 3 on both surfaces of the cleaning sheet 10 are the wiping areas 12. In a middle portion 12a of the wiping area 12, the arrangement pitch and the length of bonding lines 4 are the same as in the cleaning sheet 1. However, the arrangement pitch and the length of bonding lines 4r formed in peripheral portions 12b and 12b are made smaller compared with that of the cleaning sheet 1. That is, in the cleaning sheet 10, the bonding lines are formed more densely in the peripheral portions 12b and 12b than in the middle portion 12a. By forming the bonding lines in this manner, the volume of the peripheral portions 12b and 12b is smaller than that of the middle portion 12a, which is apparent from the section thereof. When the wiping operation is performed by using the cleaning sheet 10 having such structure, dirt is apt to adhere not only to the peripheral portions 12b and 12b but also to the middle portion 12a. In particular, when performing the wiping operation using the cleaning sheet 10 attached to a flat cleaning tool, such as a cleaning mop shown in FIG. 8, the problems of dirt adhering only to the peripheral portions 12b and 12b of the wiping area 12 and non-use of filaments in the middle portion 12a during the wiping operation effectively do not occur.

Figure 7:
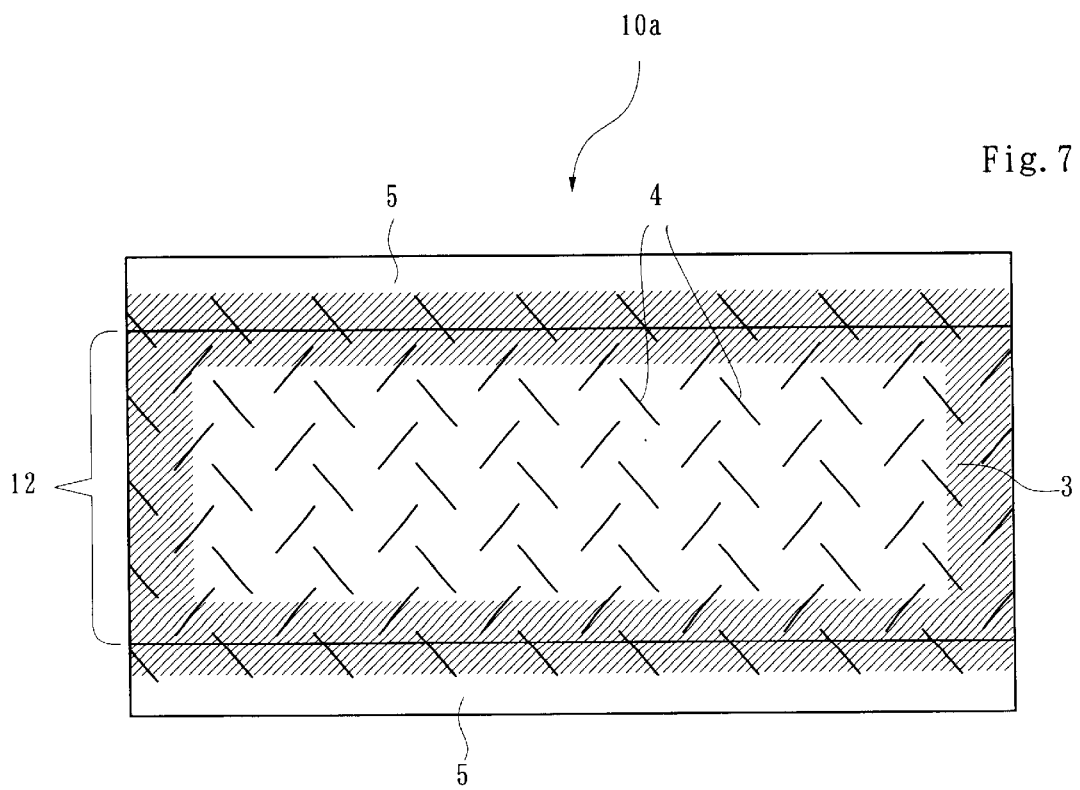
FIG. 7 is a plan view showing still another embodiment of the cleaning sheet according to the present invention.

FIG. 7 is a plan view of a further embodiment of the cleaning sheet according to the present invention.

The wiping area 12 of the cleaning sheet 10a shown in FIG. 7 is provided with the bonding lines 4 in the same manner as in the cleaning sheet 1 shown in FIG. 1, while the peripheral portions of the wiping area 12 are pressed by means of a pressing emboss roll to form small recesses, so that the volume of the peripheral portions is smaller than that of a middle portion thereof. Accordingly, the cleaning sheet 10a can attain the same effects as the cleaning sheet 10 shown in FIG. 6. In this case, since the peripheral portions are pressed only by pressure without bonding thereof, the filaments thereof are held temporarily. Accordingly, when the wiping operation is repeated, the volume of the peripheral portions is restored from the temporarily held state to the original state. Hence, when the cleaning sheet 10a is used for some time and the middle portion thereof becomes dirty, the volume of the peripheral portions is restored to its original state, so that the peripheral portions which have not been made dirty can be used effectively for the wiping operation.

FIG. 8 shows an example of the cleaning sheet in use according to the present invention.

As shown in FIG. 8, the cleaning sheet of the present invention can be attached to the cleaning mop 20 in use. The cleaning mop 20 includes a plate 21 to which a handle 22 is attached. The cleaning sheet of the present invention is mounted to the lower surface of the plate 21 so that the wiping area is opposite to an object to be cleaned such as a floor and the attachment areas at both sides of the cleaning sheet are wound up on the upper surface of the plate 21 and held by holding clips 23. Further, when the cleaning sheet is attached to the cleaning mop 20 for use as shown in FIG. 8, it is preferable that a plurality of small notches or rifts are formed in portions held by the holding clips 23 in the attachment areas of the cleaning sheet, or that the portions held by the holding clips 23 are embossed making them soft, so that the cleaning sheet is apt to be held by the holding clips 23.

The cleaning sheet of the present invention is not limited to use while attached to the cleaning mop. For example, the cleaning sheet can be held by hand or attached to a handy mop in use.

It is preferable that an oil-based agent is impregnated into the cleaning sheet of the present invention to have the tendency to absorb dust or the like. Oil-based agents include mineral oil such as paraffin oil, synthetic oil such as polyolefin oil, silicone oil, surface active agents, and the like. Furthermore, in addition to the oil-based agent described above, other materials, for example, such as deodorants, moistening agents, disinfectants, and the like, can be impregnated into the cleaning sheet of the present invention.

What is claimed is:

1. A cleaning sheet comprising:

a base sheet, and at least one surface layer placed on said base sheet, said surface layer being made of a bundle of filaments oriented in one direction, said base sheet and said surface layer both containing thermoplastic resin and being bonded to each other at a plurality of bonding lines, which are formed by fusion-bonding to reduce the thickness of the surface layer and extend to intersect said one direction, wherein each bonding line has a length never traversing the whole surface layer, and the surface layer includes a plurality of holding regions each located between two bonding lines adjacent to each other in said one direction so that said two bonding lines hold individual filaments located therein to said base sheet, wherein at least one bonding line other than said two bonding lines is partially inserted into said holding region to have one end thereof positioned therein so that some of said filaments located therein are further held to said base sheet by said inserted bonding line, whereby a difference in level between a portion of filaments held by said inserted bonding line and a portion of remaining filaments not held by said inserted bonding line is most prominent at said one end of said inserted bonding line so that dust is enabled, when the cleaning sheet is used for wiping operation, to enter a gap between the base sheet and the portion of the remaining filaments not held by said inserted bonding line, from said one end of said inserted bonding line.

2. The cleaning sheet according to claim 1, wherein:

said surface layer is made of a tow.

3. The cleaning sheet according to claim 2, wherein:

said bonding lines are parallel to one another and arranged at intervals in two directions to form a pattern of rows of parallel lines.

4. The cleaning sheet according to claim 3, wherein:

said bonding lines are inclined to said one direction.

5. The cleaning sheet according to claim 4, wherein:

each filament extends over the whole length of said surface layer in said one direction.

6. A cleaning sheet comprising:

a base sheet, and at least one surface layer placed on said base sheet, said surface layer being made of a bundle of filaments oriented in one direction, said base sheet and said surface layer both containing thermoplastic resin and being bonded to each other at a plurality of bonding lines, which are formed by fusion-bonding to reduce the thickness of the surface layer and extend to intersect said one direction, wherein said bonding lines include shorter bonding lines and longer bonding lines, and the surface layer includes a plurality of holding regions each located between two longer bonding lines adjacent to each other in said one direction so that said two longer bonding lines hold individual filaments located therein to said base sheet, wherein at least one shorter bonding line is wholly positioned within said holding region, so that some of said filaments located therein are further held to said base sheet by said shorter bonding line, whereby a difference in level between a portion of filaments held by said shorter bonding line and a portion of remaining filaments not held by said shorter bonding line is most prominent at both ends of said shorter bonding line so that dust is enabled, when the cleaning sheet is used for wiping operation, to enter a gap between the base sheet and the portion of the remaining filaments not held by said shorter bonding line, from said both ends of said shorter bonding line.

7. The cleaning sheet according to claim 6, wherein: said surface layer is made of a tow.

8. The cleaning sheet according to claim 7, wherein:

said bonding lines are parallel to one another.

9. The cleaning sheet according to claim 8, wherein:

said bonding lines are inclined to said one direction.

10. The cleaning sheet according to claim 9, wherein:

each filament extends over the whole length of said surface layer in said one direction.

11. A cleaning sheet according to claim 1 or 6 wherein:

said surface layer has a wiping area where said surface layer is exposed on the cleaning sheet and said bonding lines are formed more densely in peripheral portions of said wiping area than in a middle portion thereof so that volume of said peripheral portions of said wiping area is smaller than that of said middle portion.

12. A cleaning sheet according to claim 1 or 6, wherein:

said surface layer has a wiping area where said surface layer is exposed on the cleaning sheet and peripheral portions of said wiping area are pressed without bonding thereof so that volume of said peripheral portions is smaller than that of a middle portion of said wiping area.

13. A cleaning sheet according to claim 1 or 6, comprising an oily agent impregnated thereinto.

\* \* \* \* \*